US012666353B2

(12) United States Patent
Kinoshita

(10) Patent No.: US 12,666,353 B2
(45) Date of Patent: Jun. 23, 2026

(54) COMMUNICATION DEVICE, CONTROL METHOD FOR COMMUNICATION DEVICE, AND NON-TRANSITORY COMPUTER-READABLE STORAGE MEDIUM

(71) Applicant: CANON KABUSHIKI KAISHA, Tokyo (JP)

(72) Inventor: Akihisa Kinoshita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 316 days.

(21) Appl. No.: 18/495,629

(22) Filed: Oct. 26, 2023

(65) Prior Publication Data

US 2024/0056963 A1    Feb. 15, 2024

Related U.S. Application Data

(63) Continuation of application No. PCT/JP2022/014804, filed on Mar. 28, 2022.

(30) Foreign Application Priority Data

Apr. 28, 2021    (JP) ................................. 2021-076555

(51) Int. Cl.
*H04W 84/04* (2009.01)
*H04W 48/20* (2009.01)

(52) U.S. Cl.
CPC .......... *H04W 48/20* (2013.01); *H04W 84/047* (2013.01)

(58) Field of Classification Search
None
See application file for complete search history.

(56) References Cited

U.S. PATENT DOCUMENTS

2020/0084663 A1* 3/2020 Park ........................ H04W 8/08
2020/0396674 A1 12/2020 Yuan et al.
2021/0044958 A1* 2/2021 Abedini .................. H04W 8/14
(Continued)

FOREIGN PATENT DOCUMENTS

JP        2019534625 A    11/2019
WO        2018063892 A1    4/2018

OTHER PUBLICATIONS

ZTE; "Discussion on IAB node discovery and selection"; 3GPP TSG RAN WG3 Meeting #101bis R3-185538, Sep. 29, 2018.
(Continued)

*Primary Examiner* — Idowu O Osifade
(74) *Attorney, Agent, or Firm* — Canon U.S.A., Inc. IP Division

(57) ABSTRACT

A communication device, that functions as a node connected to user equipment in an IAB (Integrated Access and Backhaul) network, performs: determining whether a type of a network slice requested by the user equipment is supported by a first other node connected above the communication device; determining, when the communication device determines that the type of the network slice is not supported by the first other node, whether at least one other node that can connect above the communication device, supports the type of the network slice is present; and, when the communication device determines that at least one other node that supports the type of the network slice is present, connecting to a second other node among the at least one other node that supports the type of the network slice.

11 Claims, 5 Drawing Sheets

(56) References Cited

U.S. PATENT DOCUMENTS

| | | | |
|---|---|---|---|
| 2021/0258865 A1* | 8/2021 | Park | H04W 74/0833 |
| 2022/0086939 A1* | 3/2022 | Qiao | H04W 76/11 |
| 2023/0239755 A1* | 7/2023 | Teyeb | H04W 40/24 |
| | | | 370/331 |
| 2023/0328837 A1* | 10/2023 | Maeda | H04W 24/04 |
| 2023/0403067 A1* | 12/2023 | Visa | H04B 7/15592 |

OTHER PUBLICATIONS

Samsung; "Idle mobility aspects to support network slicing"; 3GPP TSG RAN WG2 NR Ad-hoc#2 Meeting; R2-1706421; Jun. 16, 2017.

* cited by examiner

F I G. 1
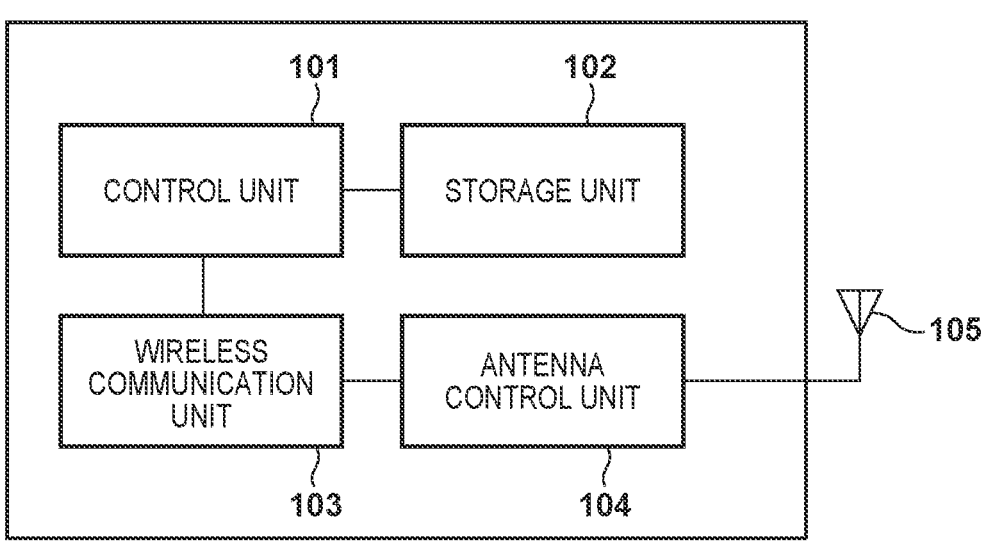
101 — CONTROL UNIT
102 — STORAGE UNIT
103 — WIRELESS COMMUNICATION UNIT
104 — ANTENNA CONTROL UNIT
105
F I G. 2
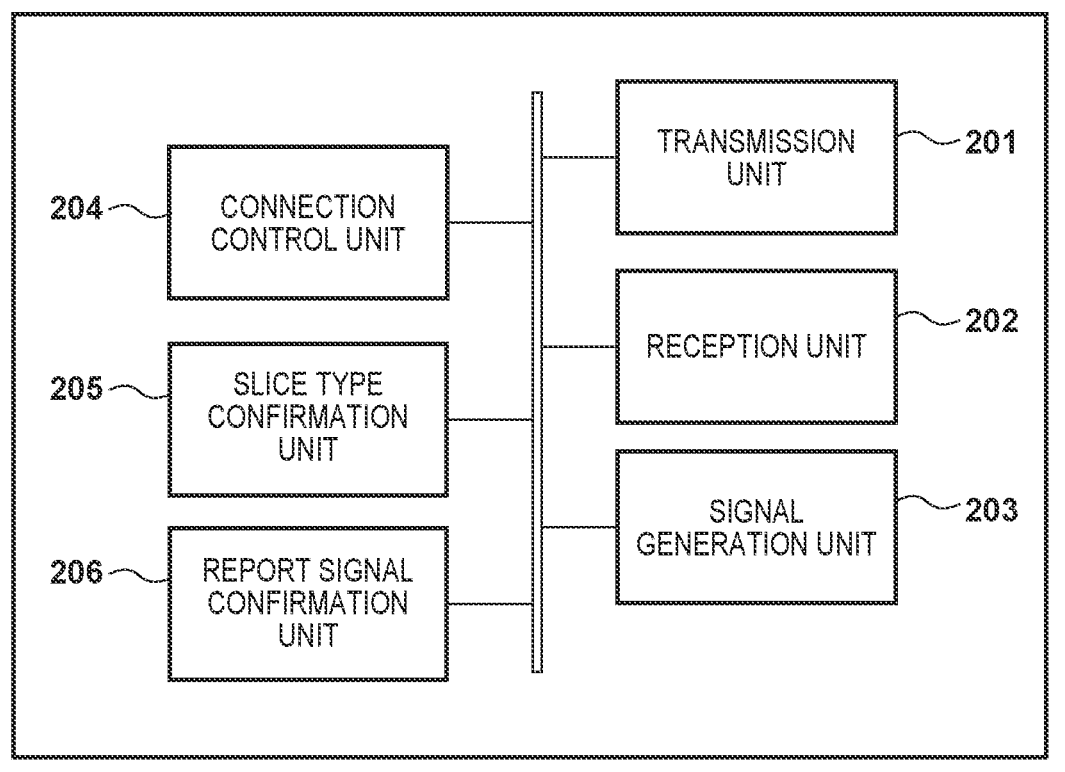
204 — CONNECTION CONTROL UNIT
205 — SLICE TYPE CONFIRMATION UNIT
206 — REPORT SIGNAL CONFIRMATION UNIT
201 — TRANSMISSION UNIT
202 — RECEPTION UNIT
203 — SIGNAL GENERATION UNIT

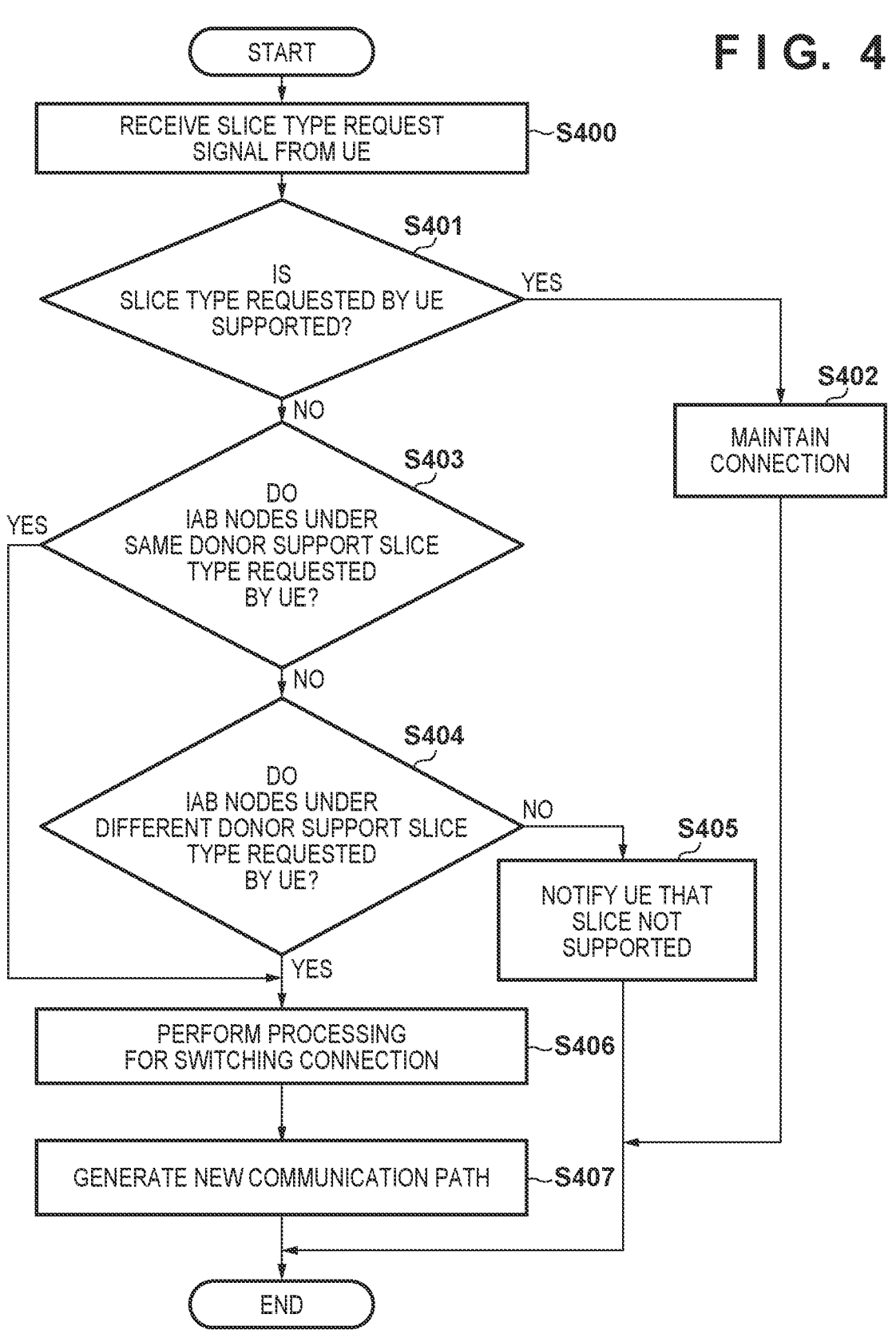
F I G.  4

COMMUNICATION DEVICE, CONTROL METHOD FOR COMMUNICATION DEVICE, AND NON-TRANSITORY COMPUTER-READABLE STORAGE MEDIUM

CROSS-REFERENCE TO RELATED APPLICATIONS

This application is a Continuation of International Patent Application No. PCT/JP2022/014804, filed Mar. 28, 2022, which claims the benefit of Japanese Patent Application No. 2021-076555, filed Apr. 28, 2021, both of which are hereby incorporated by reference herein in their entirety.

BACKGROUND OF THE INVENTION

Field of the Invention

The present invention relates to a communication device, a control method for a communication device, and a non-transitory computer-readable storage medium.

Background Art

In 3GPP (3rd Generation Partnership Project), IAB (Integrated Access and Backhaul) is being standardized as a communication technology for backhaul. IAB technology is a technology that uses millimeter wave radio communication such as the 28 GHz band, which is used for access communication between base stations and user equipment (UE (User Equipment)), simultaneously as backhaul communication (PTL 1). In backhaul communication using IAB technology, a relay device called an IAB node relays communications from an IAB donor, which is a base station, using millimeter wave communication. Using IAB technology makes it possible to expand area coverage at a lower cost than conventional wired communications using fiber optics or the like.

In backhaul communication, communication from the IAB donor, which is the relay source, is relayed from the parent node to the child nodes in sequence. For example, an IAB donor provides backhaul communication to IAB nodes connected to that IAB donor, and here, the IAB donor is the parent node, and the IAB nodes connected to that IAB donor are the child nodes. With the IAB donor (relay source) or another IAB node to which the IAB nodes are connected serving as a parent node, the IAB nodes relay the backhaul communication to the IAB nodes that are the child node connected to the IAB node. It is also possible for multiple IAB nodes to be connected to the parent node, and a tree can be constructed with the IAB donor as the starting point.

In the case of IAB technology, backhaul radio link failure (BH RLF) may occur in the links between nodes in a backhaul communication network (an IAB network), and the connections between IAB nodes may be broken and result in communication being interrupted. In the event of BH RLF, the IAB node can restore communication by switching connections to other IAB nodes to which connections can be made and re-establish the backhaul communication network. Even in situations aside from BH RLF, there may be cases where it is necessary to change already-established routes due to a drop in communication quality among IAB nodes.

Meanwhile, network slice (network slicing) technology, which is a technique for providing communication services having specified network characteristics such as bandwidth and latency (network slices), is being considered for introduction into next-generation public networks. eMBB (enhanced Mobile Broadband), which is high-speed and high-capacity communication, URLLC (Ultra-Reliable and Low Latency Communications) for low-latency communication, and MIot (Massive Internet of Things) for simultaneous multiple connections have already been standardized as types of network slices.

Two methods are conceivable as methods through which UE determines an IAB node (or IAB donor; the descriptions here will be given using an IAB node) to which to connect using the UE's desired network slice. The first method is for the UE to request the desired specific network slice from the IAB node. In this case, the UE can determine to connect to the IAB node using the specific network slice if the UE is notified by the IAB node of permission for that specific network slice. The second method is for the IAB node to notify (report) the network slices that the IAB node itself supports. In this case, the UE can determine to connect to the IAB node using the desired network slice if the UE can determine that the desired network slice is supported by that IAB node.

CITATION LIST

Patent Literature

PTL 1: Japanese Patent Laid-Open No. 2019-534625

However, there is an issue in that in backhaul communication networks such as IAB networks, if the desired network slice (communication service) of the UE is not supported by the route over which the UE connects, the UE will not be provided with the desired network slice.

Having been achieved in light of the aforementioned issue, an object of the present invention is to provide a system for providing a communication service desired by user equipment to that user equipment by reconfiguring a connection route.

SUMMARY OF THE INVENTION

In various embodiments of the present disclosure, a communication device is provided that functions as a node connected to user equipment in an IAB (Integrated Access and Backhaul) network comprises: first determining means for determining whether a type of a network slice requested by the user equipment is supported by a first other node connected above the communication device; second determining means for determining, when the first determining means determines that the type of the network slice is not supported by the first other node, whether at least one other node, among at least one other node that can connect above the communication device, that supports the type of the network slice is present; and connection means for, when the second determining means determines that at least one other node that supports the type of the network slice is present, connecting to a second other node among the at least one other node that supports the type of the network slice.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 1 is a diagram illustrating an example of the hardware configuration of an IAB node according to an embodiment.

FIG. 2 is a diagram illustrating an example of the software functional configuration of an IAB node according to an embodiment.

FIG. 4 is a flowchart of processing executed by an IAB node according to a first embodiment.

DESCRIPTION OF THE EMBODIMENTS

Figure 3:
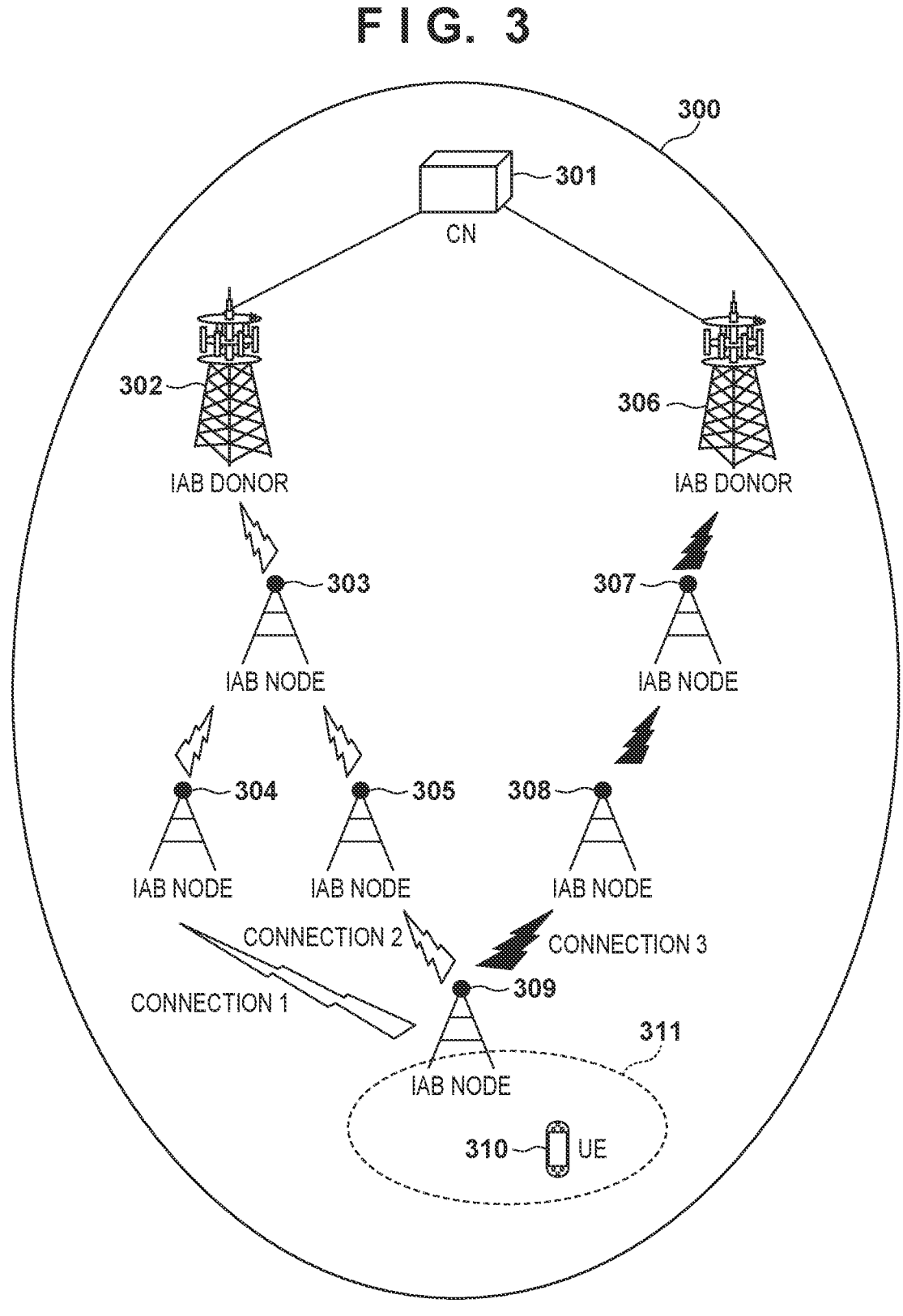
FIG. 3 is a diagram illustrating an example of the configuration of a backhaul communication system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Configuration of Communication System

FIG. 3 is a diagram illustrating an example of the configuration of a backhaul communication system ("communication system", hereinafter) according to a first embodiment. This communication network using backhaul communication can include NR (New Radio) backhaul links and NR access links. Here, the system will be described as a communication system using IAB (Integrated Access and Backhaul) technology. In a communication system 300, an IAB donor 302 and an IAB donor 306 that provide connections to a core network (CN) 301 are present. The IAB donor 302 and the IAB donor 306 provide connections to the core network 301 through backhaul communication (i.e., provide backhaul communication) to IAB nodes that connect to those IAB donors as child nodes. An IAB node 303 is connected to the IAB donor 302 as a child node. Furthermore, an IAB node 304 and an IAB node 305 are connected to the IAB node 303 as child nodes. Furthermore, an IAB node 309 is connected to the IAB node 305 as a child node. On the other hand, an IAB node 307 is connected to the IAB donor 306 as a child node, and an IAB node 308 is connected to the IAB node 307 as a child node. Each IAB donor and IAB node functions as a wireless base station device.

UE (User Equipment) 310, which communicates in a cell area 311 of a cell to which the IAB node 309 provides service, can connect to the core network 301 via each IAB donor or IAB node. In an initial state, in the communication system illustrated in FIG. 3, the UE 310 is assumed to be connected to the IAB node 309, which is the IAB node having the highest signal strength for the UE 310. Examples of the signal strength are an RSRP (Reference Signal Received Power) value, an RSCP (Received Signal Code Power) value, and the like.

The IAB node 309 is assumed to be capable of upward (uplink) communication with the IAB node 304, the IAB node 305, and the IAB node 308 ("upward direction" refers to the direction toward the core network 301). In the initial state, the IAB node 309 is assumed to be connected only to the IAB node 304 (connection 1), and not have established a connection with the IAB node 305 (connection 2) or the IAB node 308 (connection 3). In the present embodiment, if the IAB node 304 does not support the type of network slice requested by the UE 310, the IAB node 309 can change the connection from connection 1 to connection 2 or connection 3.

Hardware Configuration and Functional Configuration of IAB Nodes

The configuration (hardware configuration and software functional configuration) of the IAB node (RAN (Radio Access Network) node) according to the present embodiment will be described. FIG. 1 illustrates an example of the hardware configuration of the IAB node. A control unit 101 is constituted by one or more CPUs (Central Processing Units) and the like, and controls the device as a whole by executing a control program stored in a storage unit 102. The storage unit 102 is constituted by storage means such as a ROM (Read Only Memory) and a RAM (Random Access Memory), and stores the control program executed by the control unit 101 as well as various information such as cell information, connected terminal information, IAB routing information, and the like. Various operations (described later) can be performed by the control unit 101 executing the control program stored in the storage unit 102. In addition, a PLMN (Public Land Mobile Network) ID (Identity), which is an ID that can identify a telecommunications carrier, can be set and stored (registered) in the storage unit 102 by the telecommunications carrier. A wireless communication unit 103 executes wireless communication such as cellular network communication including LTE (Long Term Evolution), 5G (5th Generation), and the like compliant with the 3GPP (3rd Generation Partnership Project) standards. An antenna control unit 104 controls an antenna 105 for wireless communication performed by the wireless communication unit 103.

FIG. 2 illustrates an example of the software functional configuration of the IAB node. A transmission unit 201 transmits various signals (including frames and information) to other communication devices (communication partner devices) through the wireless communication unit 103 (FIG. 1). A reception unit 202 receives various signals from other communication devices through the wireless communication unit 103.

A signal generation unit 203 generates various signals to be transmitted through the transmission unit 201. For example, the signal generation unit 203 generates a report signal (report information) including NSSAI (Network Slice Selection Assistance Information), which is transmitted through the transmission unit 201. The NSSAI is constituted by one or more SSTs (Slice/Service Types) indicating the type of the network slice (hereinafter simply referred to as "slice type"). The NSSAI included in the report signal indicates the slice type that the IAB node can support. eMBB (enhanced Mobile Broadband), which is high-speed and high-capacity communication, URLLC (Ultra-Reliable and Low Latency Communications) for low-latency communication, and MIot (Massive Internet of Things) for simultaneous multiple connections have already been standardized as slice types. The report signal can include information for identifying the IAB donor to which the IAB node connects. The report signal generated by the signal generation unit 203 is periodically transmitted (reported) by the transmission unit 201 in the area in which communication is possible (the cell area) provided by the IAB node. The signal generation unit 203 can also generate a notification signal for notifying a specific destination. Such notification signals may also include the NSSAI.

A connection control unit 204 performs connection control with other communication devices by communicating through the transmission unit 201 and the reception unit 202. For example, the connection control unit 204 executes processing pertaining to connection to and disconnection from other communication devices by communicating RRC (Radio Resource Control) messages through the transmission unit 201 and the reception unit 202.

A slice type confirmation unit 205 confirms the slice types that the IAB node itself can support. The slice types that the IAB node itself can support can be determined by the NSSAI communicated from other IAB nodes or IAB donors that are connected above (upward from) that IAB node. In other words, the IAB node can support the slice types included in the NSSAI communicated from other IAB nodes or IAB donors that are connected above that IAB node. A report signal confirmation unit 206 confirms the slice type supported by the other IAB node (or IAB donor) based on the report signal (report information) from the other IAB node (or IAB donor) received by the reception unit 202.

The IAB donor can also have the same hardware configuration (FIG. 2) and software functional configuration (FIG. 3) as the IAB node. However, the IAB donor does not need to include the report signal confirmation unit 206.
Flow of Processing Operations of the IAB node connected to the UE will be described next. FIG. 4 is a flowchart of processing executed by the IAB node according to the present embodiment. The flowchart in FIG. 4 can be realized by the control unit 101 of the IAB node executing a control program stored in the storage unit 102, and computing and processing information as well as controlling each piece of hardware.

The descriptions given here will assume the communication system 300 illustrated in FIG. 3, with the processing performed by the IAB node 309. It will also be assumed that the IAB node 309 is connected to the IAB node 304 (connection 1). As described above, in the initial state, the UE 310 is connected to the IAB node 309, which is the IAB node having the highest signal strength with the UE 310 in the cell area 311.

In S400, the reception unit 202 of the IAB node 309 receives a slice type request signal from the UE 310. The request signal includes the NSSAI to indicate the requested slice type. As described above, the NSSAI is constituted by one or more SSTs (Slice/Service Types) indicating the slice type. The NASSI included in the request signal indicates the slice type requested by the UE 310.

Then, in S401, the slice type confirmation unit 205 of the IAB node 309 confirms (determines) whether the slice type in the NSSAI included in the received request signal is included in the slice types that the IAB node 309 supports. In other words, the slice type confirmation unit 205 determines whether the IAB node 309 supports the slice type requested by the UE 310. As described above, the IAB node can support the slice types included in the NSSAI communicated from other IAB nodes or IAB donors that are connected above that IAB node. Therefore, in S401, the slice type confirmation unit 205 of the IAB node 309 determines whether the IAB node 304 connected above the IAB node 309 supports the slice type requested by the UE 310. If the slice type requested by the UE 310 is supported (Yes in S401), the sequence moves to S402, and if not (No in S401), the sequence moves to S403.

Moving to S402 means that the communication path/route between the IAB node 309 and the IAB donor 302 (the communication path between one or more IAB nodes that the IAB node 309 is connected to through the IAB donor 302) supports the slice type requested by the UE. Therefore, in S402, the IAB node 309 maintains the connection, i.e., causes the UE 310 to use the communication path to which the UE 310 is connected, and then ends the sequence.

S403 and on is processing performed based on the report signals which are provided from other IAB nodes and which are received by the reception unit 202 of the IAB node 309. The report signal is assumed to include NASSI including the slice types that the source IAB node or IAB donor can support, and information for identifying the IAB donor that the source IAB node is connected to (or the IAB donor itself, if the source is an IAB donor).

In S403, the report signal confirmation unit 206 of the IAB node 309 confirms (determines) whether the IAB nodes which can connect above, and which are under the same IAB donor as the IAB donor in the connection route of the IAB node 309, support the slice type requested by the UE 310. Specifically, the report signal confirmation unit 206 confirms (determines) whether the NASSI included in the report signal communicated from the IAB node under the IAB donor 302 includes the slice type requested by the UE 310. If the IAB node under the same IAB donor supports the slice type requested by the UE 310 (the NASSI from the IAB node under the IAB donor 302 includes the slice type requested by the UE 310) (Yes in S403), the sequence moves to S406. Otherwise (No in S403), the sequence moves to S404.

In S404, the report signal confirmation unit 206 of the IAB node 309 confirms (determines) whether the IAB nodes which can connect above, and which are under a different IAB donor from the IAB donor in the connection route of the IAB node 309, support the slice type requested by the UE 310. Specifically, the report signal confirmation unit 206 confirms (determines) whether the NASSI included in the report signal communicated from the IAB node under the IAB donor 306 includes the slice type requested by the UE 310. If the IAB node under the different IAB donor supports the slice type requested by the UE 310 (the NASSI from the IAB node under the IAB donor 306 includes the slice type requested by the UE 310) (Yes in S404), the sequence moves to S406. Otherwise (No in S404), the sequence moves to S405.

The processing of S403 and S404 results in the IAB node 309 preferentially selecting and connecting to nodes under the IAB donor in the route to which the IAB node 309 is connected.

In S405, the signal generation unit 203 of the IAB node 309 generates a notification signal indicating that there is no IAB node that supports the slice type requested by the UE 310, the transmission unit 201 notifies (transmits) the signal to the UE 310, and the sequence ends.

In S406, the connection control unit 204 of the IAB node 309 performs processing for switching the connection to a higher IAB node that supports the slice type requested by the UE 310. For example, if the IAB node 304 does not support the slice type of the UE 310 request (No in S401), but the IAB node 305 does (Yes in S403), the IAB node 309 terminates the connection with the IAB node 304 and establishes a connection with the IAB node 305.

The sequence then moves to S407, where the connection control unit 204 of the IAB node 309 generates a new communication path with the higher IAB node/IAB donor that supports the slice type requested by the UE 310, after which the sequence ends.

In this manner, the IAB node 309 can connect to a higher node that satisfies the slice type requested by the UE 310. In other words, by connecting to a higher node that provides the slice type requested by the UE 310 according to the communication state, topology, and the like, the communication service requested by the UE 310 can be provided.

Although the IAB node 309 is described as an example here, the same descriptions can be applied not only to IAB nodes that are connected above the IAB node, but to IAB donors as well. For example, assume a case where UE (not shown) is connected to the IAB node 303. In this case, the IAB node 303 can confirm in S403 whether the IAB donor 302 supports the slice type requested by the UE based on the report signal. Furthermore, the IAB node 303 can confirm in S404 whether the IAB donor 306 supports the slice type requested by the UE based on the report signal. The IAB node 309 may also make a new connection with the IAB donor 306 based on a report signal from the IAB donor 306.

Additionally, although the present embodiment described the UE 310 as being the only UE connected to the IAB node 309, if other UEs are connected to the IAB node 309, the IAB node 309 may switch the connection with the UE 310 and maintain the connections with the other UEs.

If a determination of No is made in S404, the IAB node 309 may make a new connection to another IAB node/IAB donor that has a higher signal strength with that IAB node 309 and/or maintain the connection with the IAB node 304 that is connected.

After the IAB node 309 establishes a connection with the IAB node 305 in S406 and S407, the UE 310 can terminate the connection with the IAB node 309 by terminating an application or the like. At this time, for example, the IAB node 309 may terminate the connection with the IAB node 305 if, among the multiple UEs connected to the IAB node 309, there are no other UEs that use the slice type requested by the UE 310.

Operations in Communication System

Figure 5:
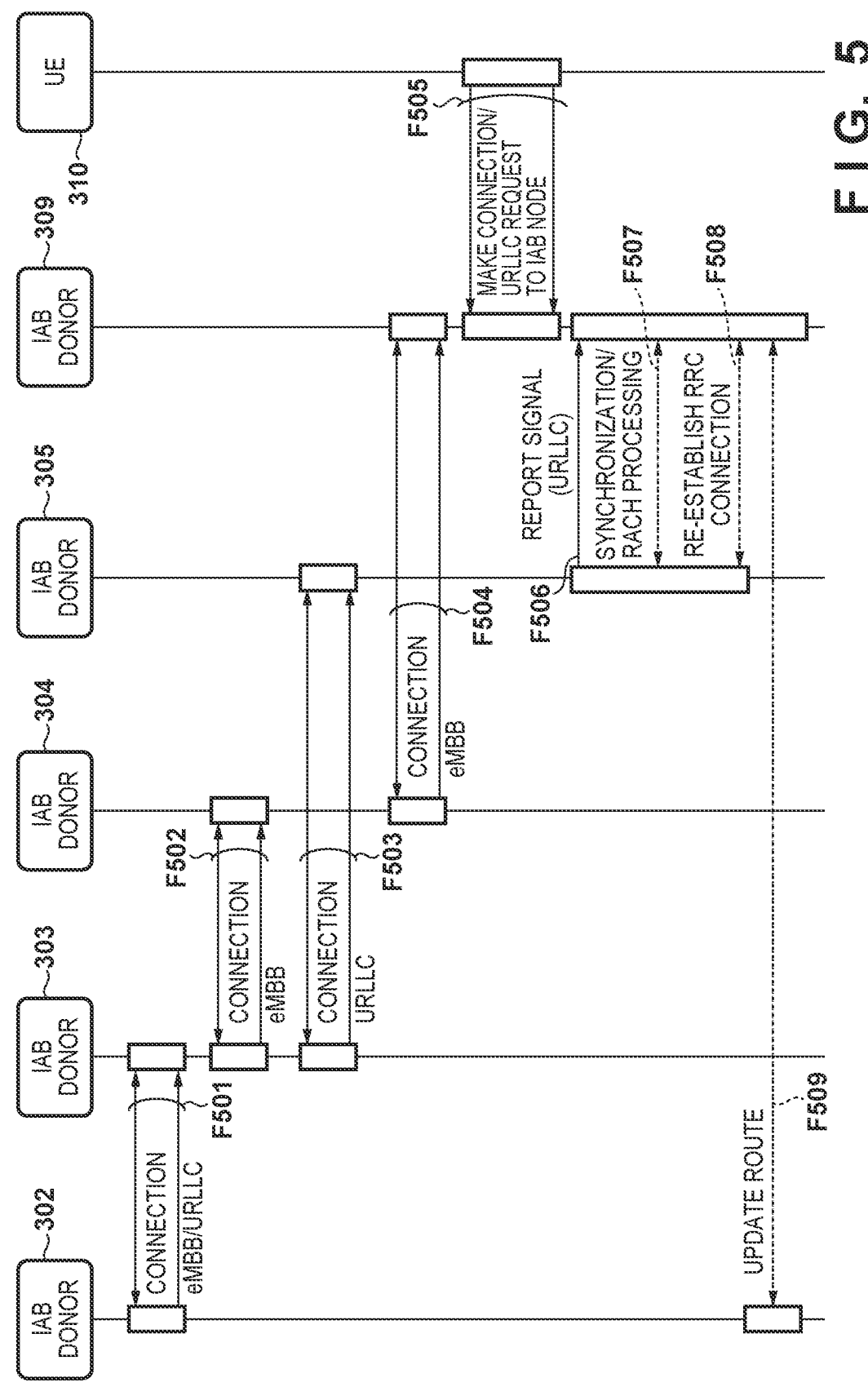
FIG. 5 is a diagram illustrating a communication sequence in the communication system according to the first embodiment.

FIG. 5 is a diagram illustrating a communication sequence in the communication system 300 according to the present embodiment. Operations performed up to when the UE 310 connects to the IAB node 309 and the IAB node 309 switches the connection to the communication path from the IAB node 304 to the upper IAB node 305 that supports the slice type requested by the UE 310 will be described here. As described above, the present embodiment assumes that the IAB node can support the slice types included in the NSSAI communicated from other IAB nodes or IAB donors that are connected above that IAB node.

At F501, the IAB donor 302, which supports eMBB and URLLC slices, connects with the IAB node 303 and notifies the IAB node 303 of the NSSAI indicating the eMBB and URLLC slice types. Accordingly, the IAB node 303 supports eMBB and URLLC slice types.

Next, at F502, the IAB node 303 connects to the IAB node 304 and notifies the IAB node 304 of the NSSAI indicating the eMBB slice type. For example, based on information received from the IAB donor, the IAB node 303 determines that the IAB node 304 can support eMBB, and thus notifies the IAB node 304 of the NSSAI indicating the eMBB slice type. Accordingly, the IAB node 304 supports the eMBB slice type.

At F503, the IAB node 303 connects to the IAB node 305 and notifies the IAB node 305 of the NSSAI indicating the URLLC slice type. For example, based on information received from the IAB donor, the IAB node 303 determines that the IAB node 305 can support URLLC, and thus notifies the IAB node 305 of the NSSAI indicating the URLLC slice type. Accordingly, the IAB node 305 supports the URLLC slice type.

At F504, the IAB node 304 connects to the IAB node 309 and notifies the IAB node 309 of the NSSAI indicating the eMBB slice type. Accordingly, the IAB node 309 supports the eMBB slice type.

Next, at F505, the UE 310 makes a connection request to the IAB node 309, which is the IAB node having the highest signal strength with that UE 310, the IAB node 309 allows the request, and connection processing is performed between the UE 310 and the IAB node 309. At that time, the UE 310 transmits a request signal to the IAB node 309, including NSSAI indicating URLLC, which is the requested slice type.

Upon receiving the request signal, the IAB node 309 determines whether the IAB node 309 and the IAB node 304 connected above the IAB node 309 support the URLLC slice type (S401 in FIG. 4). In this example, the IAB node 309 and the IAB node 304 do not support the eMBB slice types (No in S401). Accordingly, the IAB node 309 searches for an IAB node that supports URLLC based on the NASSI, which is the information included in the provided report signal. At F506, the IAB node 309 confirms that the URLLC is included in the NASSI included in the report signal provided by the IAB node 305 (Yes in S403). In other words, the IAB node 309 confirms that the IAB node 305 supports URLLC.

Because the IAB node 305 supports URLLC, at F507, the IAB node 309 and the IAB node 305 establish synchronization and perform RACH (Random Access Channel) processing. Then, at F508, the IAB node 309 connects to the IAB node 305 over an RRC connection.

At F509, because the IAB donor 302 manages route information with the IAB nodes connected under the IAB donor 302, the IAB donor 302 updates the route information between the IAB donor 302 and the IAB node 309. Specifically, the route information of a route through the IAB node 303 and the IAB node 304 is updated to route information of a route through the IAB node 303 and the IAB node 305. Thereafter, the UE 310 is capable of communicating over the network using the URLLC slice type requested by the UE 310.

At F506 in this sequence, the IAB node 309 searched for an IAB node that supports URLLC based on the NSSAI included in the report signal from a higher IAB node (or an IAB donor), but this search may also be performed through a query. For example, the IAB node 309 may search for an IAB node that supports URLLC slices by making a query to a higher IAB node as to whether that node supports URLLC, which is the slice type requested by the UE 310, and using the response in the report information from the higher IAB node.

In this manner, according to the present embodiment, even if an IAB node connected to UE does not support the communication service (slice type) requested by the UE, it is possible to provide that communication service to the UE by establishing a new route.

Second Embodiment

The first embodiment described a control method in which an IAB node connected to UE switches the connection to another IAB node that supports (ensures) the slice type required by the UE. A second embodiment will describe a control method in which the IAB node connects to a new IAB node that supports the slice type requested by the UE, while maintaining the connection with the IAB node to which a connection is already made. Matters common with the first embodiment will not be described in the present embodiment.

Flow of Processing

Figure 6:
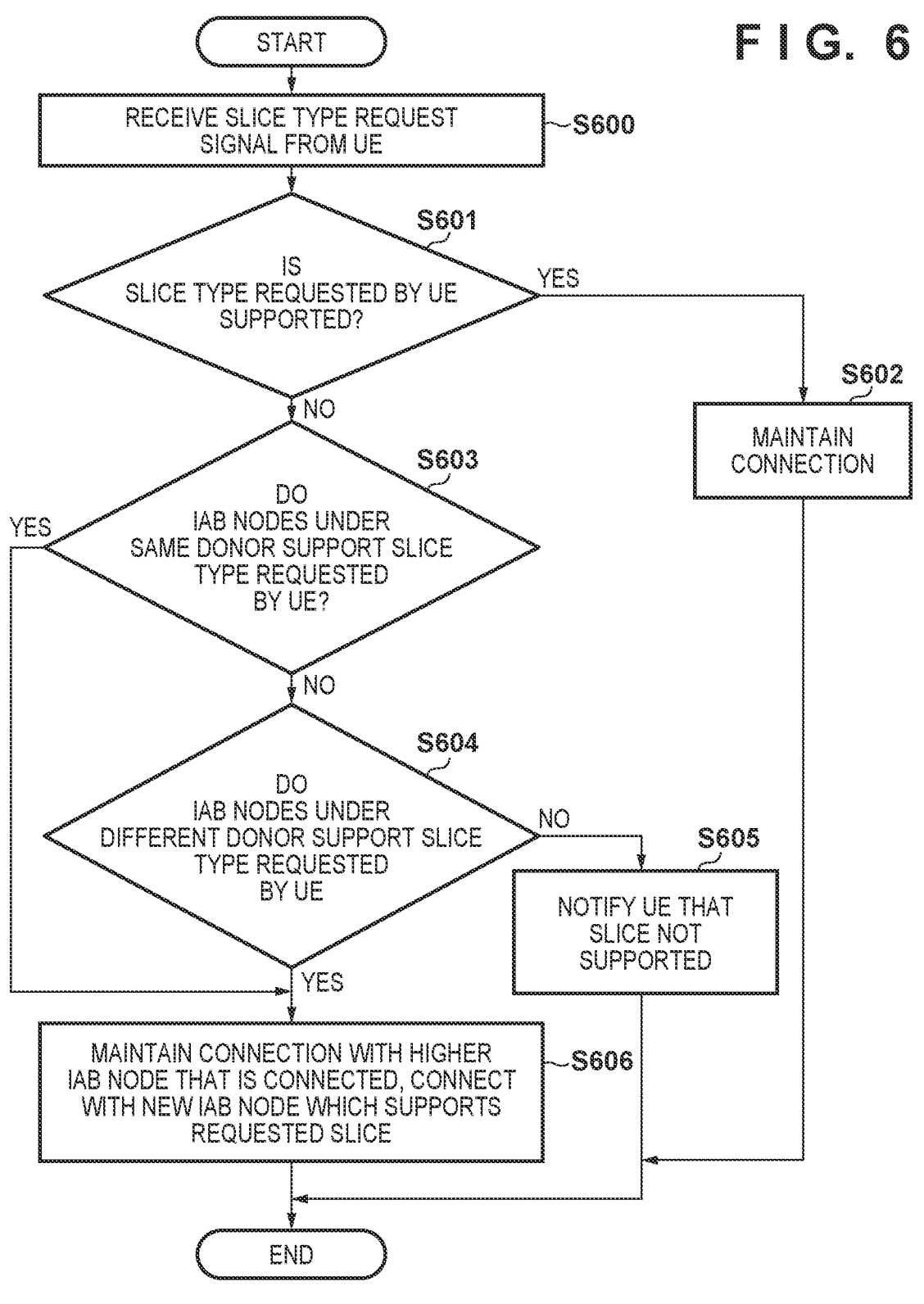
FIG. 6 is a flowchart of processing executed by an IAB node according to a second embodiment.

FIG. 6 is a flowchart of processing executed by the IAB node according to the present embodiment. The flowchart in FIG. 6 can be realized by the control unit 101 of the IAB node executing a control program stored in the storage unit 102, and computing and processing information as well as controlling each piece of hardware.

The descriptions given here will assume the communication system 300 illustrated in FIG. 3, with the processing performed by the IAB node 309. It will also be assumed that the IAB node 309 is connected to the IAB node 304 (connection 1). It is also assumed that the UE 310 is connected to the IAB node 309, which is the IAB node having the highest signal strength with the UE 310 in the cell area 311.

The processing from S600 to S605 is the same as the processing from S400 to S405 in FIG. 4 and described in the first embodiment, and will therefore not be described. In S606, the connection control unit 204 of the IAB node 309 maintains the connection with the higher IAB node 304 that is connected, and also performs new processing for connecting to the IAB node 305, which supports the slice type requested by the UE 310. Through this, the IAB node 309 generates a new communication path with the higher IAB node that supports the slice type requested by the UE, after which the sequence ends.

In this manner, according to the present embodiment, even if an IAB node connected to UE does not support the communication service (slice type) requested by the UE, it is possible to provide that communication service to the UE by establishing a new route while also maintaining the current route.

According to the present invention, a communication service desired by user equipment can be provided to that user equipment by reconfiguring a connection route.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication device that functions as an IAB (Integrated Access and Backhaul) node connected to user equipment in an IAB network, the communication device comprising:

at least one processor; and at least a memory coupled to the at least one processor and having instructions stored thereon, and when executed by the at least one processor, cause the at least one processor to perform:

determining whether a type of a network slice requested by the user equipment is supported by a first other IAB node connected above the communication device;

determining, when the communication device determines that the type of the network slice is not supported by the first other IAB node, whether at least one other IAB node, among at least one other IAB node that can connect above the communication device, that supports the type of the network slice is present; and when the communication device determines that at least one other IAB node that supports the type of the network slice is present, connecting to a second other IAB node among the at least one other IAB node that supports the type of the network slice.

2. The communication device according to claim 1, wherein the communication device determines whether the type is supported by the first other IAB node based on a signal communicated from the first other IAB node.

3. The communication device according to claim 1, wherein the communication device determines whether a node that supports the type of the network slice is present based on a signal reported from at least one other IAB node that can connect above the communication device.

4. The communication device according to claim 1, wherein the communication device makes a query to the at least one other IAB node that can connect above the communication device as to whether the type of the network slice can be supported, and determines whether a node that supports the type of the network slice is present based on a signal in response to the query.

5. The communication device according to claim 1, wherein the communication device terminates a connection with the first other IAB node and connects to the second other IAB node.

6. The communication device according to claim 1, wherein the communication device maintains a connection with the first other IAB node and connects to the second other IAB node.

7. The communication device according to claim 1, wherein as the second other IAB node, the communication device preferentially determines and connects to a node under an IAB donor in a route to which the communication device is connected, from among the at least one other IAB node that supports the type of the network slice.

8. The communication device according to claim 1, wherein at least one of the first other IAB node and the second other IAB node functions as an IAB donor.

9. The communication device according to claim 1, wherein when executed by the at least one processor, the instructions further cause the at least one processor to perform:

notifying the user equipment that a node that supports the type of the network slice is not present when the communication device determines that the at least one other IAB node is not present.

10. A control method for a communication device that functions as an IAB (Integrated Access and Backhaul) node connected to user equipment in an IAB network, the control method comprising:

determining whether a type of a network slice requested by the user equipment is supported by a first other IAB node connected above the communication device;

determining, when it is determined that the type of the network slice is not supported by the first other IAB node, whether at least one other IAB node, among at least one other IAB node that can connect above the communication device, that supports the type of the network slice is present; and connecting, when it is determined that at least one other IAB node that supports the type of the network slice is present, to a second other IAB node among the at least one other IAB node that supports the type of the network slice.

11. A non-transitory computer-readable storage medium storing a program that causes a computer to perform a control method for a communication device that functions as an IAB (Integrated Access and Backhaul) node connected to user equipment in an IAB network, the control method comprising:

determining whether a type of a network slice requested by the user equipment is supported by a first other IAB node connected above the communication device;

determining, when it is determined that the type of the network slice is not supported by the first other IAB node, whether at least one other IAB node, among at least one other IAB node that can connect above the communication device, that supports the type of the network slice is present; and when it is determined that at least one other IAB node that supports the type of the network slice is present, connect to a second other IAB node among the at least one other IAB node that supports the type of the network slice.

* * * * *